May 16, 1967 G. D. PRENTICE 3,319,832
AUTOMATIC FEEDER GATE OPERATOR
Filed Sept. 10, 1965 2 Sheets-Sheet 2

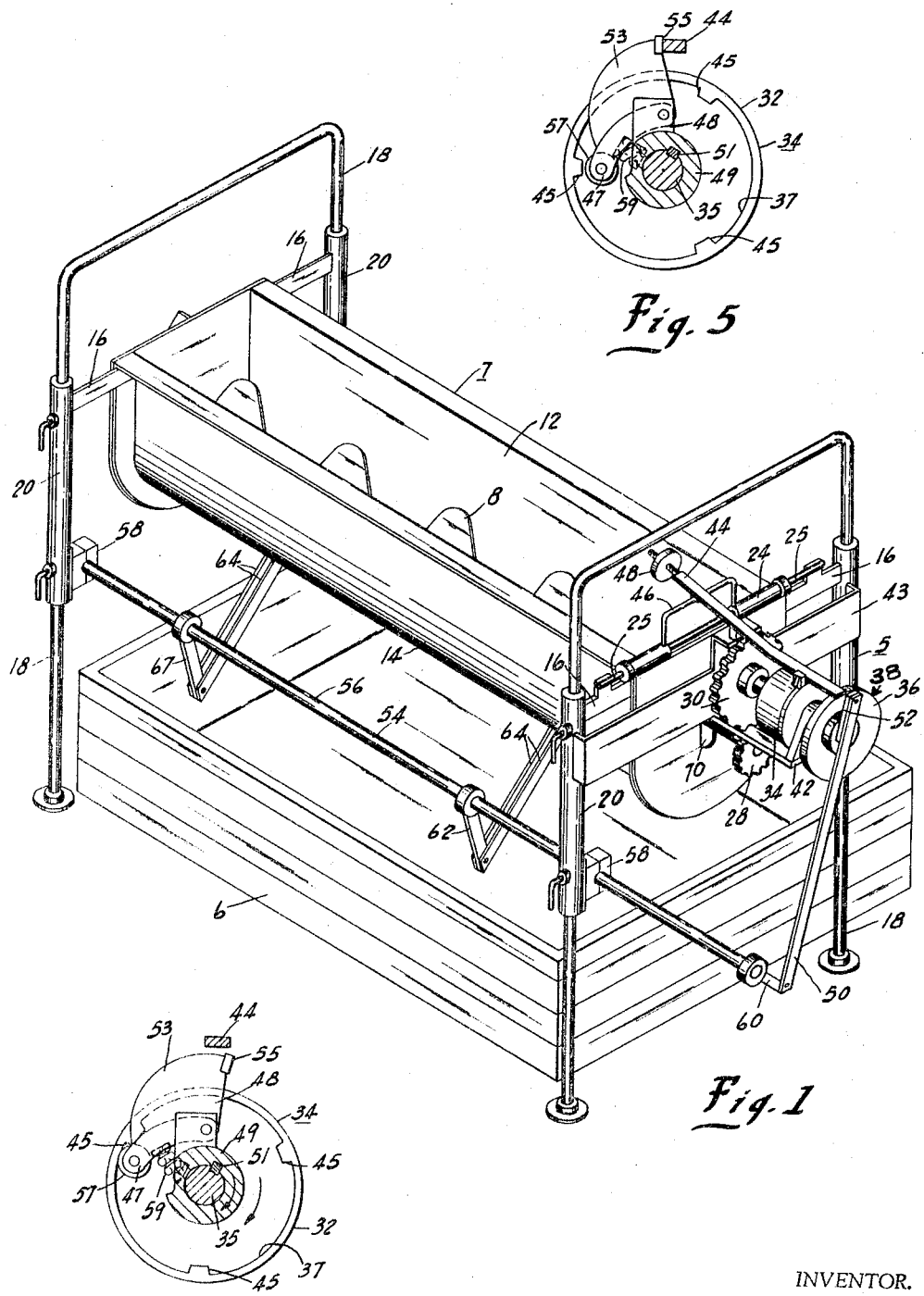

INVENTOR.
GEORGE D. PRENTICE
BY Lieber & Nilles
ATTORNEY

United States Patent Office

3,319,832
Patented May 16, 1967

3,319,832
AUTOMATIC FEEDER GATE OPERATOR
George D. Prentice, Milwaukee, Wis., assignor to A. F. Klinzing Co., Inc., Milwaukee, Wis., a corporation of Wisconsin
Filed Sept. 10, 1965, Ser. No. 486,305
5 Claims. (Cl. 222—52)

ABSTRACT OF THE DISCLOSURE

This invention relates to an automatic means for opening and closing the discharge gates of feeders. Such feeders are commonly used to supply animal feed from a silo or bulk storage structure to an animal feeding trough.

Prior art

The construction of this type of feeder includes an auger screw or other transport means lying in a conduit, one or both sides of which constitute movable doors or gates. The conduit is positioned above the feeding trough. With the gates closed, the auger screw is operated to move the feed from the silo along the length of the conduit. When the auger screw has filled the conduit, the movable gates are opened and the feed in the conduit drops into the feeding trough. The gates may also be actuated while the auger screw or other feed means is operating, and the feeder may be of any desired length with separate gate sections spaced therealong and adjusted to open to varying extents.

For satisfactory, economical operation the feeder must supply feed equally along the length of the feeding trough, in the correct amount, and with a minimum of labor and attention. If the feed is not supplied equally along the length of the feeder or feed trough, the animals using the trough will crowd to the points where the feed is concentrated, resulting in only the stronger, better fit animals receiving sufficient feed. Excessive or inadequate amounts of feed and excessive labor add, directly or indirectly, to feeding costs and hence are to be avoided.

Summary of the invention

The present invention constitutes a means for automatically opening the movable gates of the conduit to deposit the feed in the feeding trough when the auger screw has evenly filled the conduit, thereby providing equal distribution of feed in the trough. When the feed in the trough does not extend for the full length thereof, the gates are then automatically closed in preparation for another filling and opening cycle. When used in conjunction with a timing device or cycle counter, the opener may be employed to measure the amount of feed supplied to the trough in terms of the length of time the feeder operates or the number of filling and opening cycles the auger feeder and gate opener go through.

The automatic feeder gate opener of the present invention operates with a unique self-clearing action which prevents the opening mechanism from jamming due to the pressure or accumulation of feed in the conduit. Jamming of the automatic opener by feed has been a common shortcoming of openers found in the prior art.

By the nature of its automatic operation, the opener of the present invention permits feeding operations to be conducted with a minimum of human labor and supervision.

The automatic gate opener is simple and rugged in construction, thereby providing substantially trouble-free operation for substantial periods of time, reducing the amount of maintenance labor required.

Briefly, the automatic feeder gate opener of the present invention comprises an assemblage mounted on the end of the feeder opposite the bulk storage structure. The assemblage includes a drive means providing selective rotation to a cam and crank mounted thereon. A flap is pivotally mounted on the end of the feeder and is movable by the deposition of feed in the end of the feeder by the auger screw or other feed transport means. An arm, mounted on the flap and resting on the cam, is movable with the flap to induce rotation of the cam and crank. The crank is provided with a lever connected to a means for opening the gates forming the conduit around the auger screw. When the flap is moved by the deposition of feed in the end of the feeder, the arm mounted on the flap induces pivotal movement of the crank and cam. The crank and the associated lever operates the means to open the gates while the cam provides further movement of the arm and the door to assure that the gate opening mechanism has been cleared of all feed in the end of the conduit.

Description of drawings

The invention may be further understood and better appreciated by reference to the following specification and drawings, forming a part thereof, in which:

FIGURE 1 is a perspective view of a feeder including an automatic gate opener of the present invention with certain portions removed for clarity.

FIGURE 5 is a transverse cross-sectional view along line 5—5 of FIGURE 2 showing a typical clutch which may be advantageously used in the automatic gate opener of the present invention with the clutch in its disengaged position; and FIGURE 6 is a similar cross-sectional view of the clutch of FIGURE 5 but showing the clutch in its engaged position.

Figures 3, 4:
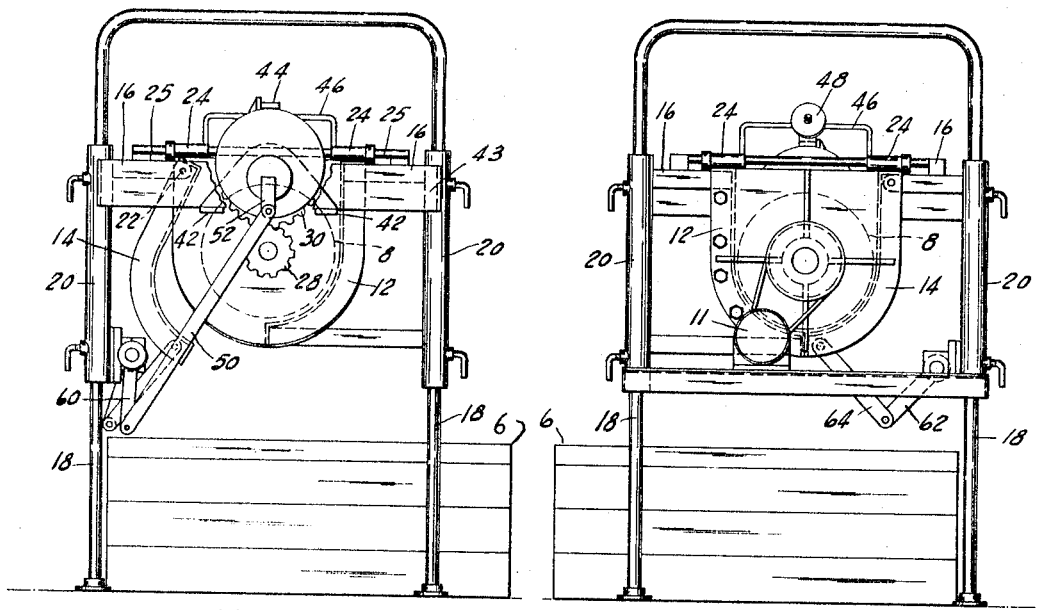
FIGURE 3 is an end view of the feeder and automatic gate opener taken along line 3—3 of FIGURE 2 and showing the gate in the opened position.
FIGURE 4 is an end view of the feeder showing the power source or drive means for the gate opener.

Referring now to the drawings and particularly FIGURE 1, there is shown therein a typical livestock feeder provided with an automatic gate opener of the present invention indicated by the numeral 5. The automatic gate opener 5 may be employed on the typical auger feeder 7 illustrated which provides feed to feeding trough 6. While both auger feeder 7 and feeding trough 6 are shown with shortened longitudinal dimensions wherein only a single gate section is provided for the length of the feeder, it is to be understood that they may be of any required length. Auger feeder 7 includes an auger screw 8 which extends from the bulk storage structure 9 to the end of auger feeder 7. Auger screw 8 is driven by motor 11 coupled to the screw at the end of the screw adjacent bulk storage structure 9. Auger screw 8 is surrounded by conduit 12, one side of which is comprised of a longitudinal movable gate 14. It will be appreciated that both sides of the conduit may consist of movable gates if desired. The auger feeder 7 may be supported above the feeding trough 6 as by means of standards 18 on which are positioned movable collars 20. Collars 20 contain supports 16 for the conduit 12 as well as pivots 22 (see FIGURE 3) for the gate 14. Collars 20 may be raised or lowered on the standards 18 to position the auger feeder 7 for various sized feeding troughs 6.

A drive means 26 is mounted on the auger screw shaft extension 10. This drive means may, for example, comprise gears 28 and 30. These gears 28 and 30 provide input power to a suitable clutch 34. Clutch 34 may be any of the commonly used devices for selectively providing power from an input shaft 33 via gears 28, 30 to an output shaft 35 in response to the movement of an actuating arm. A typical clutch suitable for such purpose is shown, by way of example, in FIGURES 5 and 6.

In the device illustrated, the output shaft 35 is suitably supported for rotation as by a supporting arm 42 extending from a bracket 43 which serves as a mounting for the clutch 34. The output shaft 35 has a collar 49 keyed thereto as at 51. In turn, the collar 49 has a radiating bracket 48 pivotally mounting a pawl 47 preferably, but not necessarily, carrying a roller 57 at its swinging end. The pawl 47 is constantly urged outwardly about its pivot by a compression spring 59 or the like, and affixed to and projecting laterally from the pawl is an actuating arm 53 having a trigger element 55 selectively engageable with a clutch actuating bar 44.

In the device illustrated, the input shaft 33 is carried and driven by the gear 30. The shaft 33, in turn, is hollow and loosely embraces the output shaft 35. A cup-shaped member 32 is mounted on the shaft 33 for rotation therewith and is positioned so that the annular wall 37 thereof surrounds the collar 49 in spaced relation thereto. The annular wall 37 of the member 32 is formed with a series of inwardly extending lugs 45 selectively engageable with the roller 57 of the pawl 47, and when the pawl is swung outwardly by the spring 59 as shown in FIGURE 6, the clutch is engaged and the output shaft 35 is driven to thus open the gate 14 and distribute feed along the bunk as is hereinafter more fully described.

An actuator in the nature of a flap or end plate 40 is positioned for pivotal movement at the end of conduit 12. The flap is fastened to collars 24 along its upper edge. Shaft 25, fixedly mounted on a support 16 extends through the collars to provide a pivot for the flap. The flap 40 has a vertically elongated aperture or slot 70 therein which permits the shaft extension 10 to extend therethrough while also permitting swinging movement of the flap. A pedestal support 46 is secured to the collars 24 for swinging movement with the end flap 40, and an actuating arm 44 is secured to the pedestal 46 to swing therewith. One end of the arm 44 extends past the trigger projection 55 of clutch 34 and controls the coupling and uncoupling action of the clutch as hereinafter described.

The output shaft 35 of the clutch 34 carries a cam 36 rotatable therewith and preferably formed with a considerable amount of eccentricity or throw. The extreme outer end of the arm 44 extends beyond the trigger 55 of the clutch and rests on the cam 36 while the other end of the arm 44 carries a counterweight 48 as shown. It is therefore apparent that swinging movement of the flap or end plate 40 and/or rotation of the cam 36 will swing the arm 44 into and out of engagement with the trigger 55 of the clutch 34 to thereby selectively disengage and/or engage the clutch.

A lever 50 is carried at one end by the radius arm 52 of crank 38, and is further connected at its opposite end to a gate opening and closing means 54 by an arm 60. The gate opening and closing mechanism comprises a shaft 56 extending through journals 58 mounted on the collars 20 and lever arms 62 mounted on shaft 56 and connected to the gate 14 by links 64 in a manner such that rotation of the shaft 56 by the arm 60 causes the linkage 62 and 64 to selectively open or close gate 14.

Figure 2:
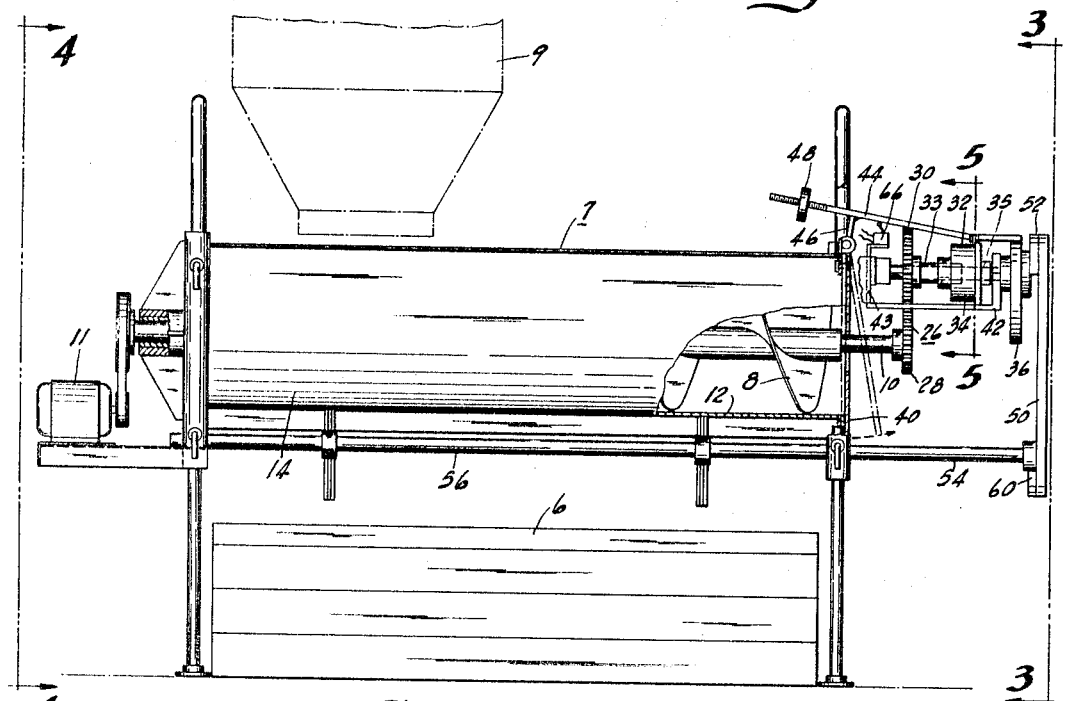
FIGURE 2 is a partially sectionalized side view of the automatic gate opener of the present invention.

The operation of the automatic gate opener 5 is as follows. Feed or other granular material is deposited in one end of auger feeder 7 as from a bulk storage structure 9. The auger screw 8 is rotated by the motor 11 to move the feed material along conduit 12, gate 14 initially being in closed condition. Gear 28 is carried by the shaft of the auger 8 and is therefore also rotated to simultaneously drive the gear 30 along with the input shaft 33 of clutch 34. Initially, clutch 34 is disengaged by the arm 44, as shown in FIGURES 1 and 5, so that no rotary power is provided to the output shaft 35. As the feed is moved along the conduit 12 it is deposited and begins to accumulate in the end of conduit 12 adjacent the end flap 40. The accumulation of feed in the end of conduit 12 swings the flap 40 as shown by the arrow in FIGURE 2. This movement of flap 40 in turn actuates the arm 44 and lifts it out of engagement with the trigger projection 55 of the clutch 34. This permits the clutch to engage, as shown in FIGURE 6, thus providing rotary power to the output shaft 35 thereof. Rotation of the output shaft 35 of clutch 34 operates the crank 36 which, through lever 50 and arm 60, rotates shaft 56. The rotation of shaft 56 swings the movable gate 14 away from the centerline of the conduit by means of arms 62 and 64 and allows the feed to fall into feeding trough 6, as shown in FIGURE 3.

Cam 36, which is also rotated by the output shaft of clutch 34, intermittently raises the arm 44 as it rotates, This intermittent upward movement of the arm 44 swings the end plate 40 while also intermittently actuating the clutch, and such action insures that any accumulation of feed adjacent the flap 40 is deposited in the feeding trough 6. The counterweight 48 determines how the arm 40 will track the cam 36 responsive to predetermined pressures at the end of the auger feeder. With counterweight 48 near the outer end of the arm 44, the amount that the flap 40 will pivot under relatively light pressures is increased as the upward acceleration of arm 4, assisted by counterweight 48, will cause arm 44 to leave cam 36. Additionally, the time interval during which such pivoting takes place is increased. With counterweight 48 nearer the bracket 46, arm 44 will be actuated only under greater pressures to closely track the cam 36 and both the magnitude and time interval of the pivoting action of flap 40 will be decreased.

As the cam 36 completes its rotation, it will allow the arm 44 to lower and again position itself in the path of the trigger projection 55 of clutch 34 to disengage the clutch. It may be easily appreciated that by the proper design of cam 36 and proper positioning of the radius arm 52 of the crank 38, the clutch 34 may be disengaged when the crank 38 is in the bottom dead center position. This serves to lock the gate 14 in its closed position so that the conduit 12 may be refilled for a subsequent operation. Such subsequent operations are performed in the same manner as described above.

It will be appreciated also that the above described automatic gate opener may also be used in conjunction with a timing device to turn the auger feeder on and off at predetermined intervals or to permit it to operate for a predetermined period of time. The gate opener may likewise be used in conjunction with an operation counter 66 actuated by the arm 44 so that the feeder and the opener perform a given number of filling, opening, closing, and refilling cycles before the counter 66 interrupts power to motor 11. In either instance, the amount of feed supplied by the auger feeder to the feeding trough may be closely controlled. Other modifications and embodiments of the invention are contemplated and it is desired to include all such embodiments as fall within the scope of the claims. Furthermore, while the invention has been shown and described as being applicable to a typical livestock feeder having an auger distributor, it is not desired to unnecessarily limit or restrict the invention by reason of such specific example since it may be obviously used to advantage in other types of feeders. It is also understood that certain specific descriptive terminology used herein shall be given the broadest possible interpretation consistent with the disclosure.

I claim:

1. An automatic gate opener for a feeder including feed transport means positioned in a conduit having at least one gate extending longitudinally thereof, said gate opener comprising; drive means providing rotary power to said opener, a clutch having an input shaft connected to said drive means and an output shaft having a crank mounted thereon, said clutch selectively coupling said input shaft to said output shaft to provide rotary power thereto and said crank being connected to a gate opening means, a flap pivotally mounted on the end of said conduit for movement upon accumulation of feed in the end of the conduit as caused by said transport means, an arm mounted on said flap and having one end cooperable with said clutch to actuate the same, whereby the output shaft of said clutch is coupled to the input shaft to operate said crank and open said gate upon movement of said arm, and means simultaneously driven to maintain said arm disengaged from said clutch for a predetermined cycle.

2. An automatic gate opener according to claim 1, wherein the output shaft of the clutch also has a cam mounted thereon which provides the means driven simultaneously with the crank and functioning to maintain the arm disengaged from the clutch for a predetermined cycle.

3. An automatic gate opener for a feeder including a driven auger screw positioned in a conduit having at least one gate extending longitudinally thereof, said gate opener comprising: drive means mounted at an end of said auger screw, a clutch having an input shaft connected to said drive means and an output shaft having a cam and a crank mounted thereon, said clutch selectively coupling said input shaft to said output shaft to provide rotary power thereto, a flap pivotally mounted on the end of said conduit for movement upon accumulation of feed in the end of the conduit as caused by said auger screw, an arm mounted on said flap and resting on said cam and cooperable with said clutch, said arm having a counterweight on one end thereof, and a lever connected to said crank and to gate opening and closing means, whereby said flap, upon movement by the accumulation of feed in the end of said conduit by said auger screw, swings said arm to cause engagement of said clutch and operation of said crank to thereby operate said lever and open and close said gate, said cam being simultaneously operated to maintain said arm disengaged from said clutch for a predetermined cycle.

4. An automatic gate opener according to claim 3, wherein the arm causes disengagement of the clutch when the crank is in its dead center position with the gate closed, thereby maintaining the gate in its closed position.

5. A feed distributing device comprising, an elongated trough having a side opening for distributing feed therefrom, a gate for opening and closing the side opening of said trough, means for conveying feed along said trough, means for actuating said gate to selectively open and close the same in response to feed accumulation and pressure build-up at one end of said trough, said gate actuating means including a clutch having an input and output shaft, a cam carried by the output shaft of said clutch, gate operating mechanism also operably connected to the output shaft of said clutch, and means responsive to pressure build-up in the trough for engaging said clutch and responsive to cam operation for permitting disengagement of said clutch.

References Cited by the Examiner

UNITED STATES PATENTS

| 3,026,845 | 3/1962 | Winter | 119—51.11 |
| 3,129,851 | 4/1964 | Seymour et al. | 119—52 X |
| 3,197,016 | 7/1965 | Jones | 198—64 |

FOREIGN PATENTS

| 1,163,075 | 2/1964 | Germany. |

SAMUEL KOREN, *Primary Examiner.*

HUGH R. CHAMBLEE, *Examiner.*